June 26, 1923.
E. MATTHEWS
SHOCK ABSORBING SPRING
Filed Oct. 17, 1921
1,459,983
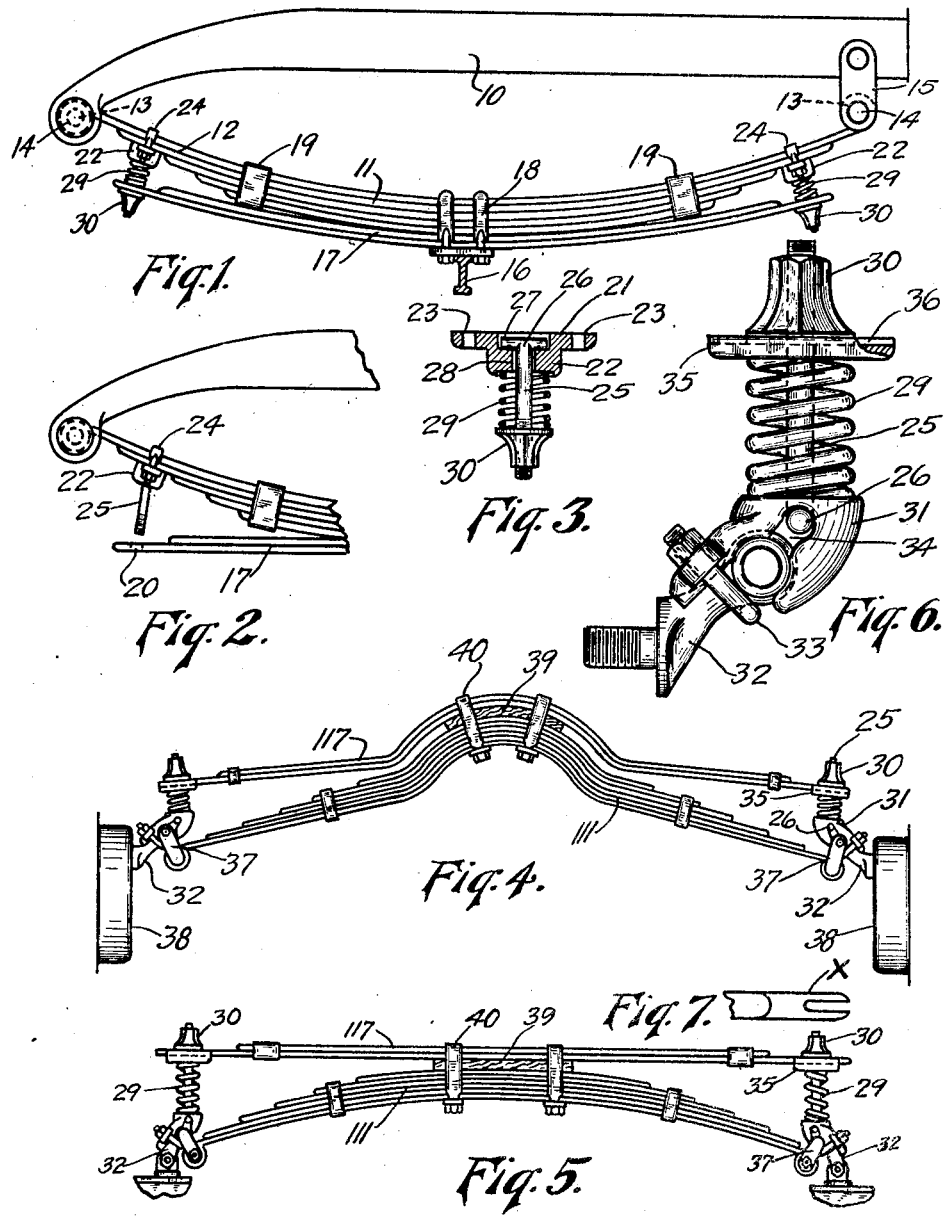
Inventor
Edward Matthews.

Patented June 26, 1923.

1,459,983

UNITED STATES PATENT OFFICE.

EDWARD MATTHEWS, OF DENVER, COLORADO.

SHOCK-ABSORBING SPRING.

Application filed October 17, 1921. Serial No. 508,097.

*To all whom it may concern:*

Be it known that I, EDWARD MATTHEWS, a citizen of the United States, residing at the city and county of Denver and State of Colorado, have invented certain new and useful Improvements in Shock-Absorbing Springs; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to springs for vehicles, and has special reference to a spring adapted to be used in connection with automobiles and similar vehicles.

The object of this invention is to provide a spring that will have easy riding qualities, and which will prevent the rebound due to the sudden recoil of the ordinary springs.

In my copending application, Serial Number 423,802, filed November 13, 1920, I have shown and described a shock absorbing spring of the same general type as the one forming the subject matter of the present application. The present invention is in the form of an improvement over what is shown in the above referred to application and in my Patent 1,281,187, granted October 8, 1918.

In order to more clearly describe my invention, I shall have reference to the accompanying drawing in which—

Fig. 1 shows my auxiliary spring applied to a semi-elliptical spring of ordinary construction;

Fig. 2 shows the relative positions of the two springs before they are connected together;

Fig. 3 is a longitudinal section of the connecting means;

Fig. 4 is a view showing my device applied to a rear spring of the type employed on the Ford cars;

Fig. 5 shows my device applied to the front spring of the Ford type;

Fig. 6 shows my resilient shackle attached to the perch of a Ford car; and

Fig. 7 is a detail showing the end of the auxiliary spring.

The same reference numerals will be employed to represent the same parts throughout the several views.

A chassis bar 10 carries the main spring 11 in the ordinary manner. The ends of the master leaf 12 are each provided with an eye 13 for the reception of bolts 14, the front end being connected between the sides of the downwardly curved front end of bar 10 and the rear end to the lower ends of shackles 15. Underneath main spring 11, between it and the axle 16, I place my auxiliary spring 17 and clamp them both in position by means of U bolts 18. Near the ends of spring 11 the ordinary clamps 19 are provided. My auxiliary spring 17 is composed of two or more leaves and reversely arranged with respect to spring 11. The ends of spring 17 are provided with a hole 20.

In order to operatively connect the auxiliary spring 22 to the main spring, I provide a shackle comprising a bar 21, provided centrally with a hub-like portion 22. On each side of hub 22 I provide holes 23 for the reception of U-shaped clamping bolts 24, by means of which the shackle is connected to the main spring, as shown in Figs. 1 and 2. A T bolt 25 has its transverse portion 26 located in a depression 27 on the back of bar 21, and projects through a hole 28 in the hub. Hole 28 is somewhat larger than bolt 25, in order to permit the latter to rock to a certain extent. A spring 29 surrounds the bolt and is held in place by nut 30, which is purposely made with a long threaded hole so as to prevent it from becoming unscrewed. The shackle is attached to the main spring in the manner shown in Fig. 2. The spring 29 is then put in place around the bolt, and spring 17 is bent into the position shown in Fig. 1 and held in place by nut 30. As spring 17 is reversely arranged with respect to spring 11 and bent into place by the use of considerable force, it is evident that it will act on the main spring in the same manner as a weight placed on bar 10, and cause the latter to yield more readily to slight variations in the road. When the wheels strike a depression or pass over an elevation, which produces a great flexure of the main spring, the auxiliary spring will first assist in bending the main spring, and afterwards it will assist the main spring in resisting flexure. When the flexure is sufficient to bend the springs beyond the position of the auxiliary spring shown in Fig. 2, the coil spring 29 will be compressed. On the recoil of spring 11, auxiliary spring 17 will oppose its action and prevent the sudden and excessive upward throw by which the discomfort and damage is accomplished.

In applying my approved arrangement to a spring construction of the usual Ford type, I replace bar 21 by a corresponding member 31, which is designed to fit over the head of the spring perch 32, in the manner shown in Fig. 6, and is held securely in place on the perch by means of a U-shaped clamping bolt 33. A transverse channel 34 serves for the reception of the head 26 of bolt 25. Spring 29 surrounds bolt 25 and carries on its top a plate 35, which is provided with a channel 36 for the reception of the end X of the auxiliary spring.

The rear spring 111 is supported by shackles 37 pivotally connected to perches 32, which in turn are bolted to brake drum 38. Auxiliary spring 117 is spaced from main spring 111 by means of a spacing member 39, and clamped thereto by U clamps 40. The ends are slotted as shown in Fig. 7 and rest in channel 36 of member 35.

In Fig. 5 I have shown a Ford front spring equipped with my shock absorbing spring, and with the exception of some obvious changes, the arrangement is the same as that shown in connection with the rear spring, and will not be described in detail.

It will be noticed, from a comparsion of my present disclosure with that of the application and patent referred to, that my improvement consists mainly in the substitution of a shackle having means for adjusting the distance between the springs and the provision of a resilient spacing member, which coacts with the auxiliary spring to produce a spring with more desirable qualities than the same arrangement would have with a non-resilient connection. Spring 29 also has the function of preventing rattling of the spring and the shackle. I have found that whenever the spring shackle described in this application has been substituted for the ordinary shackles, shown in my patent and in the application referred to, that the operation of the springs has been greatly improved, and by virtue of the adjustable feature, the tension between the main and auxiliary springs can be altered until the best results are obtained. It is well known that springs gradually acquire a permanent set, due to overloading and excessive strains to which they are invariably subjected. By means of my adjustable shackles I am able to make the necessary adjustment to keep the springs in the most desirable operative relationship.

Having now described my invention, what I claim is—

1. In combination a supporting member, a spring perch secured to the same, a main spring, a shackle connecting the end of the spring to the perch, a member clamped to said perch, a bolt non-rotatably connected with said member, a helical spring surrounding said bolt, a plate provided with an opening slidably connected with said bolt and resting on said spring, an auxiliary spring centrally connected with the first mentioned spring, an opening in the end of said auxiliary spring, said opening engaging the bolt, and a nut cooperating with said bolt whereby the end of the auxiliary spring may be adjusted with relation to the main spring.

2. In combination a supporting member, a pair of spring perches secured to the same, a main spring, a shackle connecting each end of the spring with a perch, a member clamped to each perch, a bolt non-rotatably connected with each of said members, a helical spring surrounding each of said bolts, a plate slidably connected with each bolt and resting on the spring, an auxiliary spring centrally connected with the main spring, the ends of said auxiliary spring resting on said plates, and opening in the ends of said auxiliary spring for the reception of the bolt, and a nut cooperating with the bolt and adapted to adjust the position of the auxiliary spring ends with relation to the perch.

In testimony whereof I affix my signature.

EDWARD MATTHEWS.